United States Patent
Iyer et al.

(10) Patent No.: US 10,262,696 B1
(45) Date of Patent: Apr. 16, 2019

(54) CLOCK SYNCHRONIZATION FOR PLAYBACK OF MULTIMEDIA FILES

(71) Applicant: ANI Technologies Private Limited, Bengaluru, Karnataka (IN)

(72) Inventors: Sriram V Iyer, Karnataka (IN); Vasuki K Setlur, Karnataka (IN); Arun Samudrala, Karnataka (IN)

(73) Assignee: ANI Technologies Private Limited, Bengaluru, Karnataka (IN)

( * ) Notice: Subject to any disclaimer, the term of this patent is extended or adjusted under 35 U.S.C. 154(b) by 0 days.

(21) Appl. No.: 15/938,362

(22) Filed: Mar. 28, 2018

(30) Foreign Application Priority Data

Oct. 13, 2017 (IN) .............................. 201741036391

(51) Int. Cl.
| | |
|---|---|
| H04N 5/932 | (2006.01) |
| G11B 27/10 | (2006.01) |
| H04N 21/43 | (2011.01) |
| H04N 21/414 | (2011.01) |
| H04N 5/931 | (2006.01) |
| H04L 29/08 | (2006.01) |

(52) U.S. Cl.
CPC ....... G11B 27/10 (2013.01); H04N 21/41422 (2013.01); H04N 21/4302 (2013.01); H04L 67/12 (2013.01)

(58) Field of Classification Search
CPC .............. G11B 27/10; H04N 21/4302; H04N 21/41422; H04L 67/12
USPC ................ 386/201, 207, 202, 239, 248, 263
See application file for complete search history.

(56) References Cited

U.S. PATENT DOCUMENTS

| | | | |
|---|---|---|---|
| 5,832,170 A * | 11/1998 | Keery | G06T 3/4015 386/302 |
| 7,738,499 B2 | 6/2010 | Kugumiya et al. | |
| 8,224,147 B2 | 7/2012 | Wilcox et al. | |
| 8,966,370 B2 * | 2/2015 | Steiner | H04L 65/80 715/719 |
| 2013/0070860 A1 | 3/2013 | Schramm et al. | |

* cited by examiner

Primary Examiner — Robert Chevalier
(74) Attorney, Agent, or Firm — Goldberg Segalla LLP

(57) ABSTRACT

A clock synchronizing system and method for playback of a multimedia file is provided. A first device receives the multimedia file that includes at least an audio component and a video component. A second device receives the multimedia file from the first device. During a playback of the multimedia file, the first device renders the audio component by way of a first multimedia player and the second device renders the video component by way of a second multimedia player. The first device further transmits periodic clock information to the second device. The second device synchronizes a clock of the second multimedia player with a clock of the first multimedia player, based on the periodic clock information.

18 Claims, 6 Drawing Sheets

CLOCK SYNCHRONIZATION FOR PLAYBACK OF MULTIMEDIA FILES

CROSS-RELATED APPLICATIONS

This application claims priority of Indian Application Serial No. 201741036391, filed Oct. 13, 2017, the contents of which are incorporated herein by reference.

FIELD OF THE INVENTION

The present invention relates generally to playback of multimedia files, and more particularly, to a system and a method for synchronizing clocks of multiple devices in an automotive environment.

BACKGROUND

Vehicle service providers have employed various schemes in order to provide a pleasant ride experience to their passengers. One of these schemes is an in-vehicle entertainment system, where the passengers can choose to play a multimedia file of their choice for the duration of the ride. The in-vehicle entertainment systems generally include a vehicle head unit, inbuilt speakers, and a display device. The vehicle head unit controls a playback of the multimedia file through the inbuilt speakers and the display device of the in-vehicle entertainment system. The display device may be internal to the vehicle, i.e., a display screen, tablet, and the like, or external to the vehicle, i.e., a passenger's phone could be configured as the display device.

A multimedia file includes an audio component and a video component. The audio component and the video component may be rendered simultaneously on various devices of the in-vehicle entertainment system. In an example, the vehicle head unit may render the audio component, whereas the video component may be rendered by way of the display device. Thus, the vehicle head unit may render the audio component by way of its multimedia player, hereinafter "first multimedia player" and the display device may render the video component by way of its multimedia player, hereinafter "second multimedia player".

The first and second multimedia players derive their processing clocks, hereinafter "first and second clocks", from the processing clocks of the vehicle head unit and the display device, respectively. In order to ensure a smooth playback of the multimedia file, the first and second clocks need to be synchronized. However, a clock rate of the first clock may be different as compared to a clock rate of the second clock. For example, the first clock may have a clock rate of 1 gigahertz (GHz) while the second clock may have a clock rate of 1.2 GHz. Thus, the first and second multimedia players will have clock rates of 1 GHz and 1.2 GHz, respectively. As the first and second multimedia players play the audio and video components simultaneously, the difference in the clock rates will affect the playback of the multimedia file thus causing the audio and video components to be de-synchronized. De-synchronization of the audio and video components may cause lip-sync' error, since the video component will be rendered at a faster rate as compared to the audio component. This will lead to an unpleasant travel experience for the passengers.

Hence, it would be advantageous to have an in-vehicle entertainment system that synchronizes the playback of the video component and the audio component across multiple devices having dissimilar processor clock rates.

SUMMARY

In an embodiment of the present invention, a clock synchronizing system for playback of a multimedia file is provided. The system includes a first device that includes a memory and a processor. The memory is configured to store the multimedia file. The multimedia file includes at least an audio component and a video component. The processor communicates with the memory, and renders the audio component by way of a first multimedia player. The processor is configured to transmit the multimedia file to a second device by way of a communication network. The processor is further configured to transmit periodic clock information that is associated with a first clock of the first multimedia player, to the second device. The second device renders the video component by way of a second multimedia player. The second device synchronizes a second clock of the second multimedia player with the first clock of the first multimedia player based on the periodic clock information.

In another embodiment of the present invention, a clock synchronizing system for playback of a multimedia file is provided. The system includes a first device that receives the multimedia file from a second device by way of a communication network. The multimedia file includes at least an audio component and a video component. The first device renders the video component by way of a first multimedia player and the second device renders the audio component by way of a second multimedia player. The first device further receives periodic clock information that is associated with a first clock of the second multimedia player, from the second device. The first device further synchronizes a second clock of the first multimedia player with the first clock of the second multimedia player based on the periodic clock information.

In yet another embodiment of the present invention, a method for clock synchronization is provided. A multimedia file is received by a first device from a second device by way of a communication network. The multimedia file includes at least an audio component and a video component. The first device renders the video component by way of a first multimedia player and the second device renders the audio component by way of a second multimedia player. The first device receives periodic clock information associated with a first clock of the second multimedia player. The first device synchronizes a second clock of the first multimedia player with the first clock of the second multimedia player based on the periodic clock information.

Various embodiments of the present invention provide method and system for synchronizing clocks of multiple devices for playback of multimedia files in an automotive environment. A first device installed in a vehicle receives various multimedia files that include a first multimedia file, from a server. The first multimedia file includes an audio component and a video component. The first device communicates with the server by means of a first communication network. Further, the first device communicates with a second device by means of a second communication network. The first device transmits a list of the multimedia files to the second device. The passenger selects a multimedia file, i.e., the first multimedia file, from the list. The second device transmits information pertaining to the selection of the first multimedia file to the first device. Based on the information, the first device transmits the first multimedia file to the second device for a playback of the first multimedia file. The first device renders the audio component by way of a first multimedia player, and the second device renders the video component by way of a second multimedia player. The first device further transmits periodic clock information to the second device through the second communication network. The second device synchronizes a clock of the second multimedia player with a clock of the first multimedia player when the second device receives the periodic clock information within a predetermined time interval. Thus, the audio and video components are synchronized to ensure that the audio and video components are played at the same time instance.

The second device rejects the periodic clock information when the second device receives the periodic clock information after the predetermined time interval. Thus, the system does not require additional hardware for synchronizing the clocks of two different devices. Further, the second device prevents the occurrence of a lip-sync error during the playback of the first multimedia file, thereby providing a pleasant ride to the passengers.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components, which constitutes a system for synchronizing playback of multimedia files across multiple devices. Accordingly, the components and the method steps have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Figure 1:
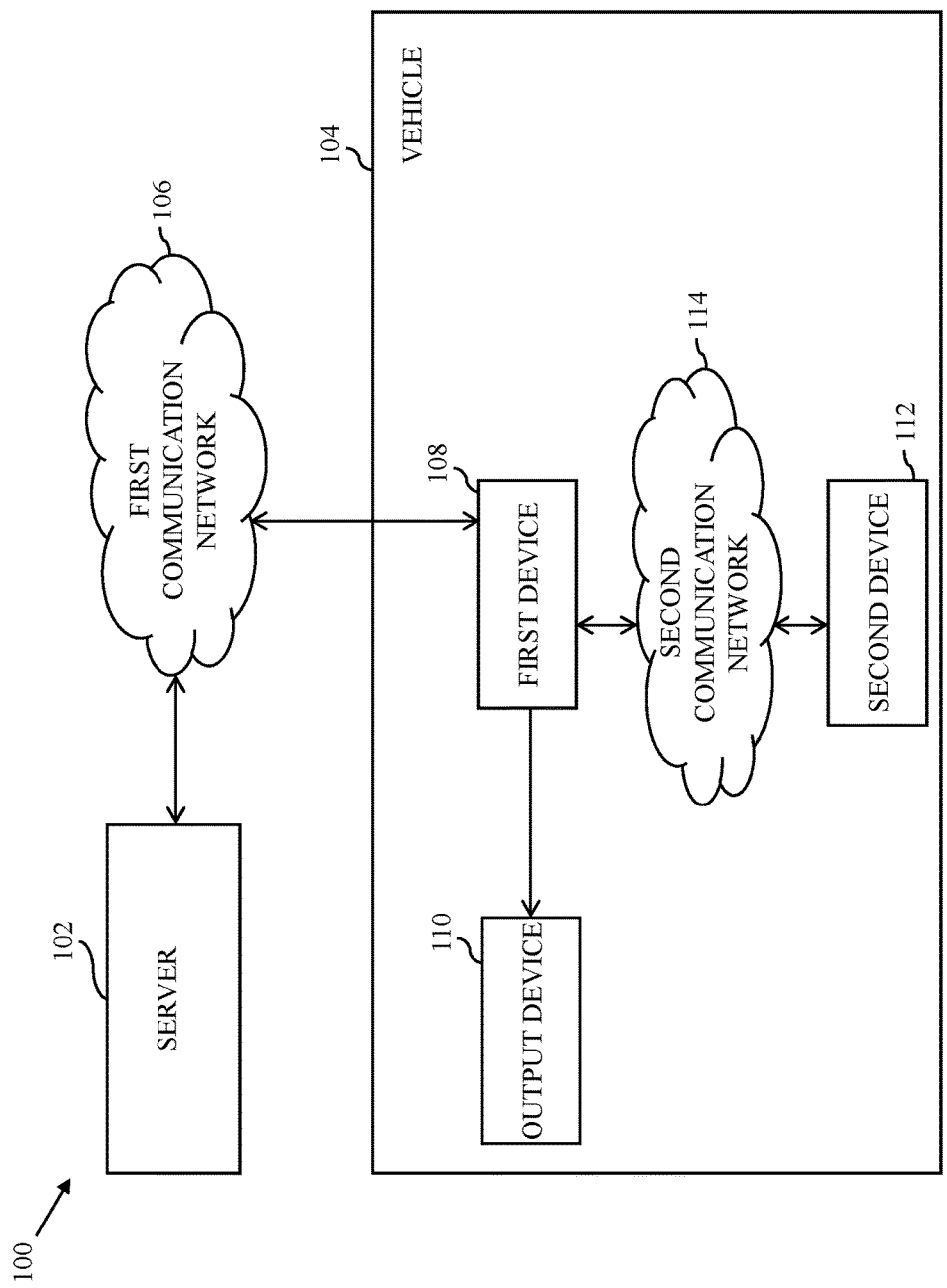
FIG. 1 is a block diagram that illustrates a system environment for synchronizing clock of multiple devices for playback of multimedia files in accordance with an embodiment of the present invention.

Referring now to FIG. 1, a block diagram that illustrates a system environment 100 for synchronizing clock of multiple devices for playback of multimedia files in accordance with an embodiment of the present invention is shown. The system environment 100 includes a server 102. In one example, the system environment 100 is implemented in an automotive environment that includes a vehicle 104. The server 102 transmits the multimedia files by way of a first communication network 106. The vehicle 104 includes a first device 108, an output device 110, and a second device 112. The first device 108 communicates with the second device 112 by way of a second communication network 114.

The server 102 is a content management server that manages entertainment content, such as the multimedia files of various movies, television shows, songs, audiobooks, and the like. Thus, a first multimedia file may correspond to a movie and a second multimedia file may correspond to a television show. The server 102 includes a processor (not shown) and a memory (not shown). The memory stores the multimedia files. Further, each multimedia file includes an audio component and a video component. The audio and video components include fragments of audio and video data, respectively. Each fragment of audio and video data is associated with a time stamp that indicates a time sequence in which the corresponding fragment of audio and video data is to be played. Examples of the server 102 include, but are not limited to, a personal computer, a laptop, or a network of computer systems. The server 102 transmits various multimedia files, such as the first multimedia file to the first device 108 by way of the first communication network 106. Examples of the first communication network 106 include, but are not limited to, a Wi-Fi network, a light fidelity (Li-Fi)

network, a satellite network, an internet, a mobile network such as cellular data, high speed packet access (HSPA), or any combination thereof.

The vehicle 104 corresponds to a means of transport that is deployed by a vehicle service provider, such as a taxicab provider, to provide ride services to passengers. In an embodiment, the vehicle 104 is an automobile, a bus, and the like. In another embodiment, the vehicle 104 is a train, an airplane, and the like. Passengers may travel in the vehicle 104 to commute from a source location to a destination location. The vehicle 104 includes the first device 108 for receiving the first multimedia file from the server 102. In one embodiment, the first device 108 is a vehicle head unit. In another embodiment, the first device 108 is an external communication device, which is placed in the vehicle 104.

The output device 110 emits audio signals of the multimedia files. In an example, the first multimedia file includes a first audio component and a first video component. Thus, the output device 110 emits an audio signal of the first multimedia file, i.e., the output device 110 renders the first audio component. Examples of the output device 110 include speakers, headphones, and the like.

The second device 112 communicates with the first device 108 by way of the second communication network 114. The second device 112 renders the first video component. Examples of the second device 112 include a smartphone, a personal digital assistant (PDA), a tablet, or any other portable communication device. The second communication network 114 establishes a communication channel between the first and second devices 108 and 112. Examples of the second communication network 114 include a Wi-Fi network, a Bluetooth low-energy (BLE) network, a Li-Fi, a fiber optic network, a coaxial cable network, an infrared network, a radio frequency (RF) network, or any combination thereof.

Figure 2:
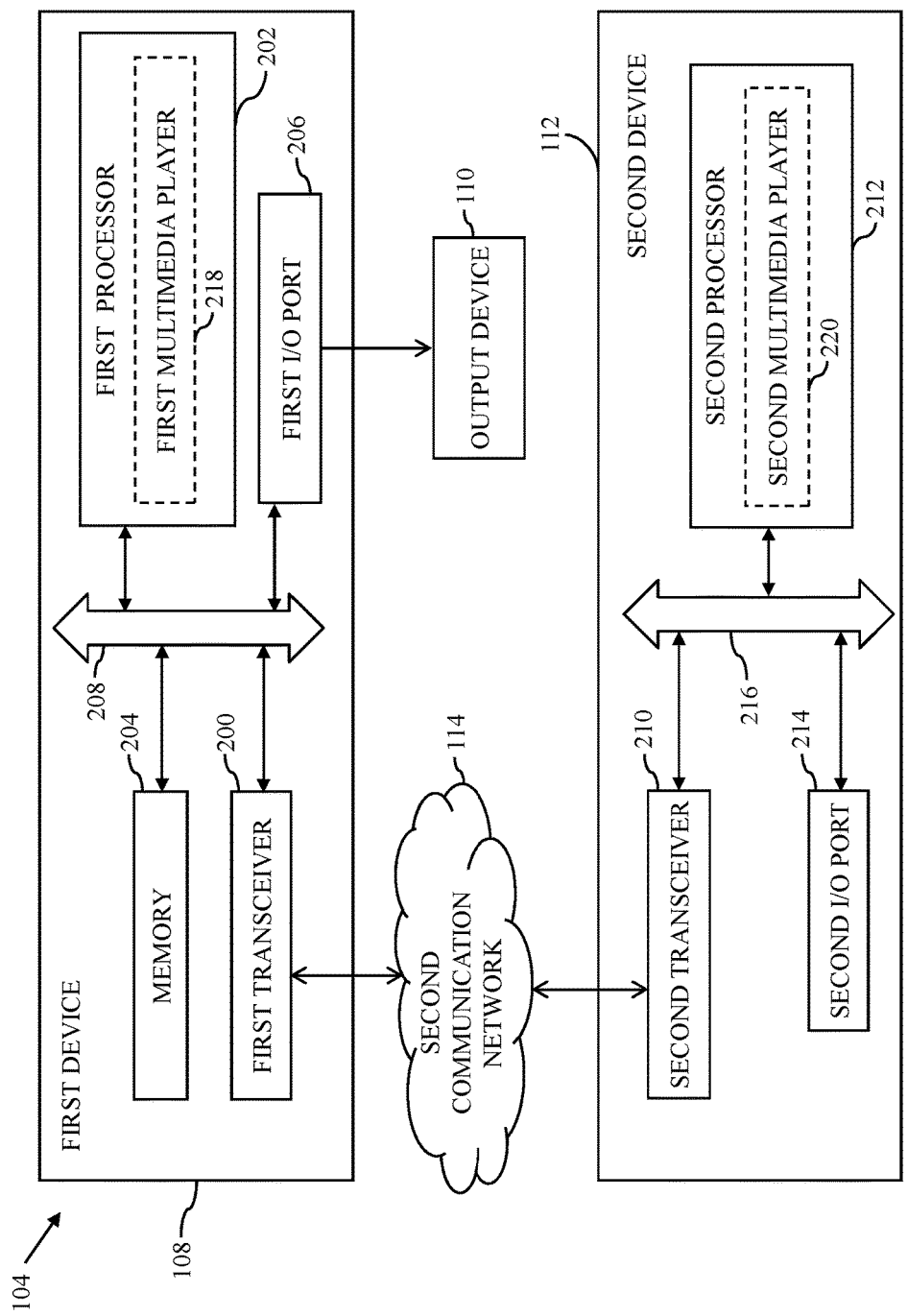
FIG. 2 illustrates first and second devices of the system environment of FIG. 1 in accordance with an embodiment of the present invention.

Referring now to FIG. 2, the first and second devices 108 and 112 of the system environment 100 in accordance with an embodiment of the present invention are shown. The first device 108 includes a first transceiver 200, a first processor 202, a memory 204, and a first input/output (I/O) port 206. The first transceiver 200, the first processor 202, the memory 204, and the first I/O port 206 communicate with each other by way of a first bus 208. The second device 112 includes a second transceiver 210, a second processor 212, and a second I/O port 214. The second transceiver 210, the second processor 212, and the second I/O port 214 communicate with each other by way of a second bus 216.

The first transceiver 200 includes suitable logic, circuitry, and/or interfaces to transmit or receive messages from various devices, such as the server 102 and the second transceiver 210. The first transceiver 200 communicates with the server 102 through the first communication network 106, and the second transceiver 210 through the second communication network 114. The first transceiver 200 receives the first multimedia file from the server 102. The first transceiver 200 transmits the first multimedia file to the second device 112. Examples of the first transceiver 200 include, but are not limited to, an antenna, a radio frequency transceiver, a wireless transceiver, a Bluetooth transceiver, and the like. The first transceiver 200 communicates with the server 102, the first processor 202, and the second transceiver 210 using various wired and wireless communication protocols, such as TCP/IP, UDP, 2nd Generation (2G), 3rd Generation (3G), 4th Generation (4G) communication protocols, or any combination thereof.

The first processor 202 includes suitable logic, circuitry, and/or interfaces to execute instructions stored in the memory 204. The first processor 202 receives and stores the first multimedia file in the memory 204. Further, the first processor 202 transmits the first multimedia file to the second transceiver 210 by way of the first transceiver 200. The first processor 202 further receives control commands from the second processor 212 for controlling the playback of the first multimedia file. Examples of the first processor 202 include an application-specific integrated circuit (ASIC) processor, a reduced instruction set computing (RISC) processor, a complex instruction set computing (CISC) processor, a field-programmable gate array (FPGA), and the like. It will be apparent to a person skilled in the art that the first processor 202 is compatible with multiple operating systems. The first processor 202 plays the first audio component of the first multimedia file through the output device 110 by way of a first multimedia player 218. The first multimedia player 218 further derives its clock, hereinafter a "first clock", from a clock of the first processor 202. Further, the first processor 202 generates periodic clock information associated with the first clock of the first multimedia player 218 for synchronizing the first multimedia file. Examples of the first multimedia player 218 include Quicktime® player, Windows® Media Player, Video LAN client (VLC®) media player, RealPlayer®, iTunes®, and the like.

The memory 204 includes suitable logic, circuitry, and/or interfaces to store the first multimedia file. Examples of the memory 204 include, but are not limited to, a random access memory (RAM), a read-only memory (ROM), a programmable ROM (PROM), an erasable PROM (EPROM), and the like. The first I/O port 206 includes suitable logic, circuitry, and/or interfaces that connect the first device 108 to various input and output devices, such as the output device 110, of the vehicle 104. Examples of the first I/O port 206 include a universal serial bus (USB) port, an Ethernet port, and the like.

The second transceiver 210 includes suitable logic, circuitry, and/or interfaces to transmit or receive messages from various devices, such as the first transceiver 200. The second transceiver 210 communicates with the first transceiver 200 through the second communication network 114. The second transceiver 210 receives the first multimedia file from the first transceiver 200. Further, the second transceiver 210 transmits control commands to the first transceiver 200 for controlling the playback of the first multimedia file. Examples of the second transceiver 210 include, but are not limited to, an antenna, a radio frequency transceiver, a wireless transceiver, a Bluetooth transceiver, and the like. The second transceiver 210 communicates with the first transceiver 200 and the second processor 212 using various wired and wireless communication protocols, such as TCP/IP, UDP, 2G, 3G, 4G communication protocols, or any combination thereof.

The second processor 212 includes suitable logic, circuitry, and/or interfaces to provide a playback of the multimedia files requested by a passenger travelling in the vehicle 104. In an example, a passenger selects the first multimedia file. In one embodiment, the second processor 212 receives the first multimedia file and extracts the first video component. The second processor 212 further generates control command based on inputs provided by the passenger. Examples of the second processor 212 include an ASIC processor, a RISC processor, a CISC processor, an FPGA, and the like. It will be apparent to a person skilled in the art that the second processor 212 is compatible with multiple operating systems. The second processor 212 plays the first video component by way of a second multimedia player 220. The second multimedia player 220 further derives its clock, hereinafter "second clock", from a clock of the second processor 212. The second processor 212 further receives periodic clock information by way of the second transceiver 210. The second processor 212 further synchronizes the playback of the first multimedia file based on the periodic clock information. Examples of the second multimedia player 220 include Quicktime® player, Windows® Media Player, Video LAN client (VLC®) media player, RealPlayer®, iTunes®, and the like.

The second I/O port 214 includes suitable logic, circuitry, and/or interfaces that provides an output to the passenger and further enables the passenger to provide an input for controlling a playback of various multimedia files. The second I/O port 214 may include output devices, such as a speaker, a Liquid crystal display (LCD) screen, a Light emitting diode (LED) screen, headphones, and the like. Further, the second I/O port 214 may include input devices, such as a touchscreen, a keyboard, a mouse, a joystick, a microphone, and the like.

In operation, the server 102 transmits the first multimedia file to the first device 108 through the first communication network 106. The first transceiver 200 receives the first multimedia file and stores the first multimedia file in the memory 204. The first processor 202 determines whether a ride has started. Alternatively stated, the first processor 202 determines whether a passenger has boarded the vehicle 104 for a ride. When the first processor 202 determines that the ride has started, the first transceiver 200 initiates a communication with the second transceiver 210 through the second communication network 114. Further, the first processor 202 transmits a set of identifiers associated with a corresponding set of multimedia files stored in the memory 204 to the second transceiver 210. In one example, the set of identifiers includes a first identifier associated with the first multimedia file. In one embodiment, the first identifier is a title of the first multimedia file.

The second transceiver 210 receives the set of identifiers. Further, the second processor 212 renders the set of identifiers through the second I/O port 214 for the passenger travelling in the vehicle 104. The passenger selects one identifier of the set of identifiers. In one example, the passenger selects a first identifier. In one embodiment, the passenger selects the first identifier by pressing a physical key on the second I/O port 214. In another embodiment, the passenger selects the first identifier by pressing a virtual key on the second I/O port 214. In yet another embodiment, the passenger selects the first identifier by directly clicking on the first identifier rendered through a Graphical User Interface (GUI). It will be apparent to a person skilled in the art that the passenger may use any other input providing mechanism known in the art for selecting the first identifier. The second transceiver 210 further transmits information pertaining to the selection of the first identifier to the first transceiver 200 through the second communication network 114.

The first transceiver 200 receives the information pertaining to the selection of the first identifier and communicates it to the first processor 202. The first processor 202 determines that the passenger wants to view the first multimedia file. Therefore, the first processor 202 transmits the first multimedia file to the second transceiver 210 through the second communication network 114. In one example, the first transceiver 200 streams the first video component to the second transceiver 210. The passenger controls the playback of the first multimedia file (hereafter, referred to as "multimedia file") by providing a set of inputs. In one example, the passenger provides a first input to play the multimedia file and a second input to stop the playback of the multimedia file. The passenger provides the inputs by pressing a physical key or virtual key on the second I/O port 214. It will be apparent to a person skilled in the art that the passenger may use any other input providing mechanism known in the art for providing the set of inputs.

The first processor 202 generates periodic clock information for synchronizing the playback of the multimedia file. In one example, the periodic clock information represents a count of clock cycles of the first clock that have elapsed between a first time instance and a second time instance. The first time instance represents a time instance at which the playback of the multimedia file is initiated. The second time instance represents a current time instance at which the first processor 202 transmits the periodic clock information. In another example, the periodic clock information represents a count of machine cycles executed by the first processor 202 between the first and second time instances.

The first processor 202 transmits the periodic clock information by way of the first transceiver 200 to the second processor 212 at periodic time intervals. In one example, the first processor 202 transmits the periodic clock information at a periodic time interval of 60 seconds. Hence, after every 60 seconds the first processor 202 generates the periodic clock information and transmits it to the second processor 212. In one embodiment, the periodic clock information further includes a time stamp that indicates a time instance at which the periodic clock information is transmitted by the first processor 202 to the second processor 212.

The second processor 212 receives the periodic clock information by way of the second transceiver 210. The second processor 212 further determines that the periodic clock information is valid when the second processor 212 receives the periodic clock information within a predetermined time interval. In one example, the predetermined time interval represents a network jitter of the second communication network 114. The second processor 212 retrieves the time stamp from the periodic clock information to determine the time instance at which the first processor 202 transmits the periodic clock information. In one example, the predetermined time interval is 10 milliseconds. Thus, when the periodic clock information is received within 10 milliseconds from the time instance indicated by the time stamp, the second processor 212 determines that the periodic clock information is valid. In one scenario, the second processor 212 determines that the periodic clock information is invalid, when the periodic clock information is received after the predetermined time interval. For example, the second processor 212 determines that the periodic clock information is invalid and rejects the periodic clock information when the periodic clock information is received after 10 milliseconds from the time instance indicated by the time stamp.

The second processor 212 utilizes the periodic clock information to synchronize the second clock of the second multimedia player 220 with the first clock of the first multimedia player 218, thereby synchronizing the playback of the multimedia file. For example, the second processor 212 synchronizes a count of clock cycles of the second clock that have elapsed between the first time instance and the second time instance with the count of clock cycles in the periodic clock information.

Thus, the system environment 100 provides a mechanism for synchronizing playback of multimedia files across multiple devices. The system environment 100 utilizes the periodic clock information for synchronizing the playback of multimedia files across multiple devices, such as the first and second devices 108 and 112. Therefore, the system environment 100 does not require additional hardware for synchronization. In addition, the system environment 100 provides a mechanism to synchronize the audio and video components of the multimedia file played on different multimedia players, which further have different clocks, such as the first and second clocks. Hence, the system environment 100 prevents lip sync error caused due to difference in the first and second clocks.

Figure 3:
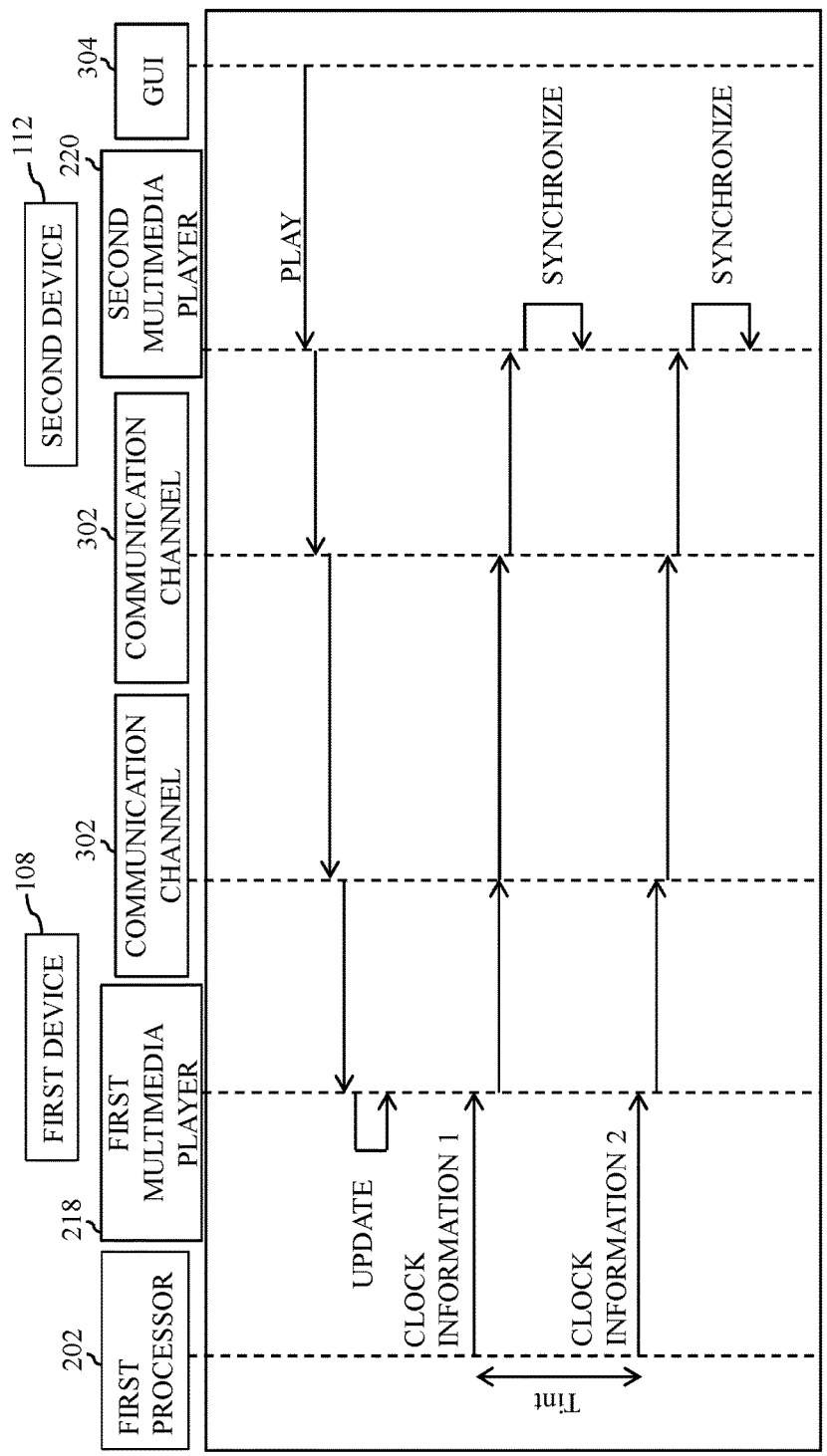
FIG. 3 illustrates a process flow diagram for synchronizing a clock of the second device with a clock of the first device of FIG. 2 for the playback of the multimedia files in accordance with an embodiment of the present invention.

Referring now to FIG. 3, a process flow diagram for synchronizing the second clock with the first clock in accordance with an embodiment of the present invention is shown.

The first device 108 receives the multimedia file selected by a user from the server 102 and stores it in the memory 204. The first device 108 transmits the multimedia file to the second device 112 via the communication channel 302 based on a selection by the passenger. The first and second devices 108 and 112 are network synchronized. Hence, when the passenger provides the first input to play the multimedia file through a GUI 304 rendered on the second device 112, the multimedia file is played on the first and second devices 108 and 112 simultaneously. The first device 108 generates first periodic clock information and transmits it to the second device 112 by way of the communication channel 302. The second device 112 receives the first periodic clock information and determines whether the first periodic clock information is received within the predetermined time interval. The second device 112 rejects the first periodic clock information when the second device 112 receives the first periodic clock information after the predetermined time interval. The second device 112 synchronizes the second clock of the second multimedia player 220 with the first clock of the first multimedia player 218 when the second device 112 receives the first periodic clock information within the predetermined time interval. After the periodic time interval "Tint", the first device 108 further generates second periodic clock information and transmits it to the second device 112. The second device 112 receives the second periodic clock information and synchronizes the second clock with the first clock based on the second periodic clock information.

It will be apparent to a person having skill in the relevant art that the first device 108 may not store the multimedia file in the memory 204 and directly transmit to the second device 112 without deviating from the scope of the invention.

Figure 4A:
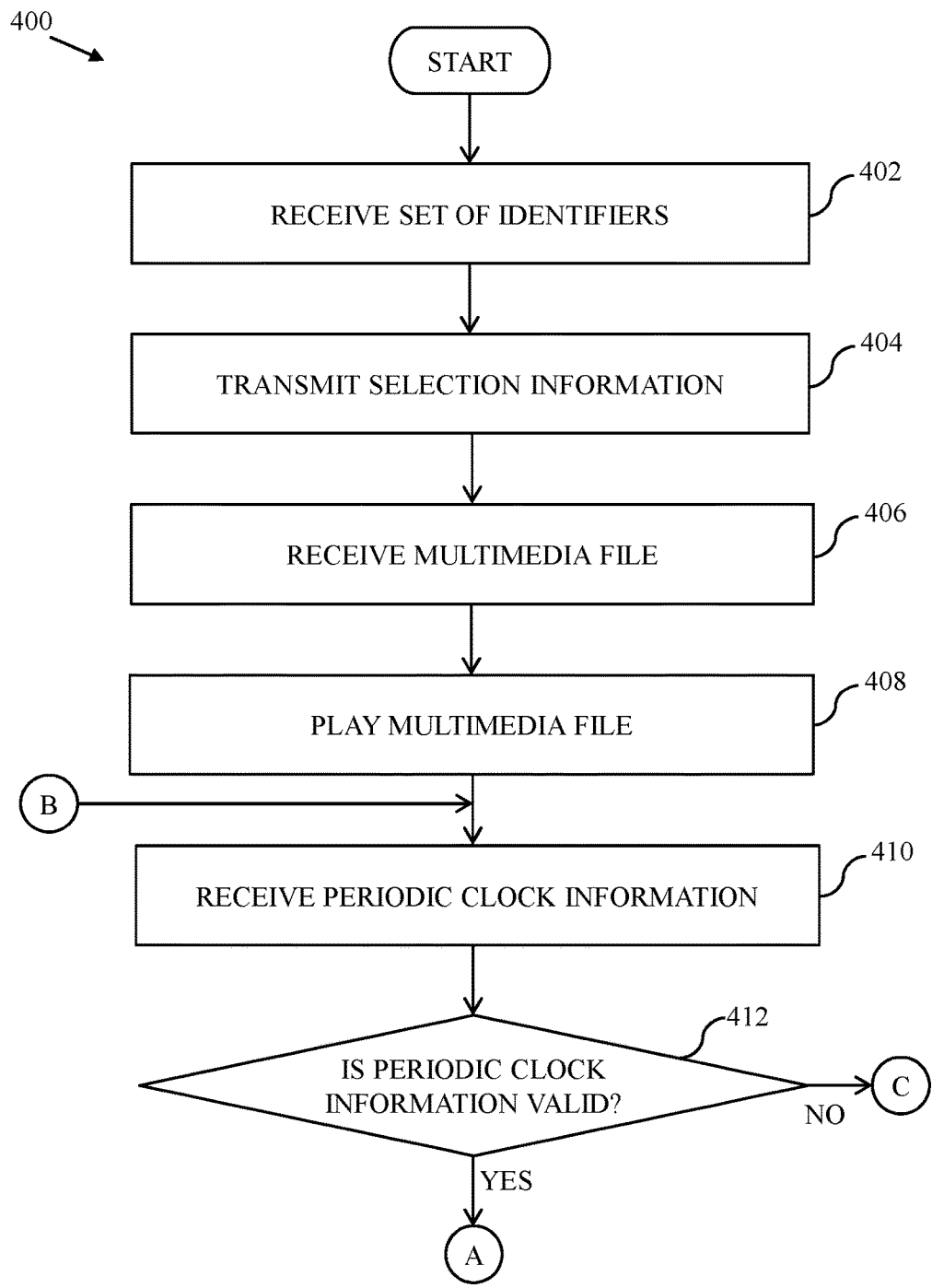
FIGS. 4A-4C, collectively, represent a flow chart that illustrates a method for synchronizing clock of multiple devices for playback of multimedia files in the system environment of FIG. 1 in accordance with an embodiment of the present invention.
Figure 4B:
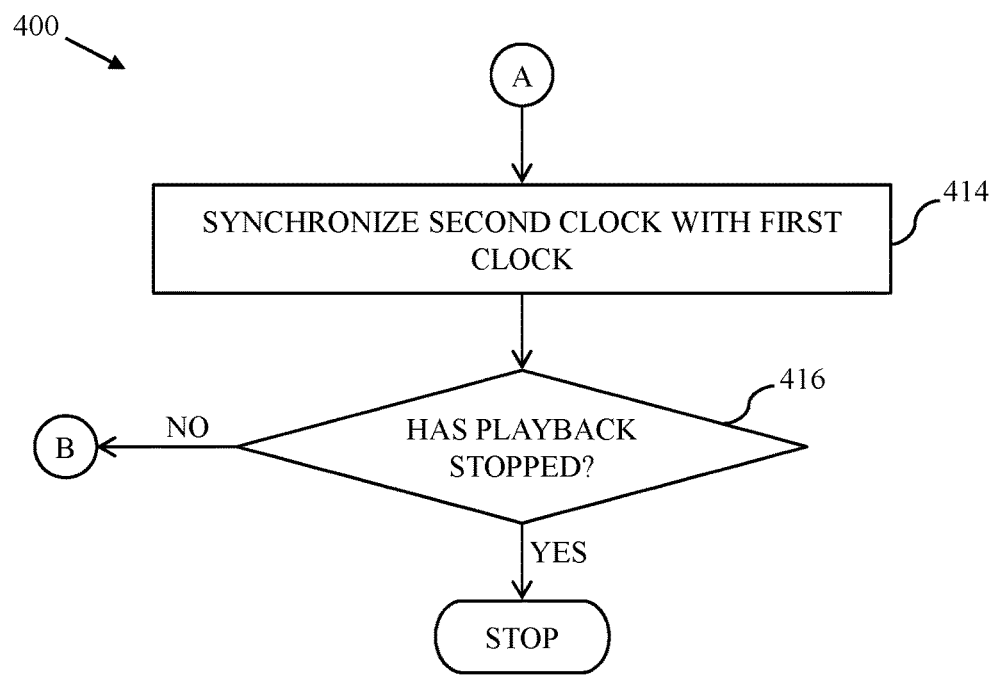
Figure 4C:
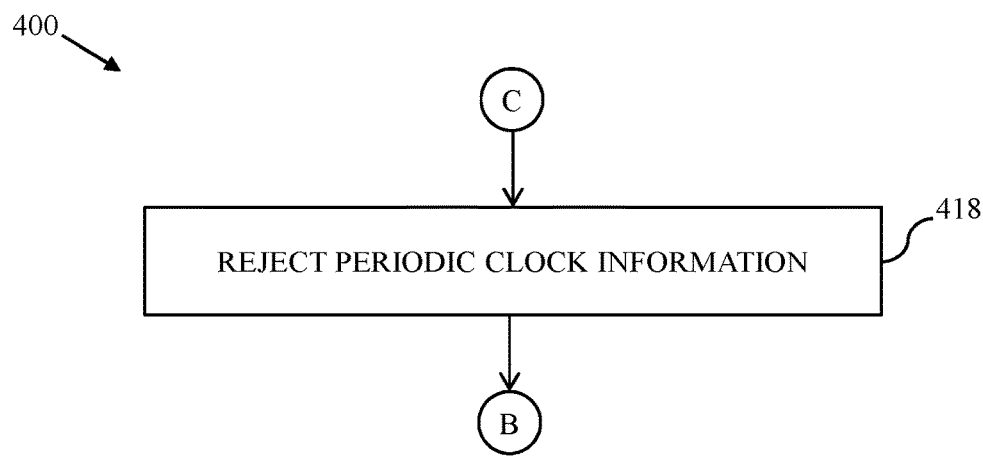

Referring now to FIG. 4A-4C, a flowchart 400 that illustrates a method for synchronizing the second clock with the first clock for playback of multimedia files in accordance with an embodiment of the present invention is shown.

At step 402, the second device 112 receives the set of identifiers, associated with a corresponding set of multimedia files from the first device 108 by way of the second communication network 114. At step 404, the second processor 212 transmits selection information based on the user input to the first device 108. At step 406, the second device 112 receives a multimedia file, i.e., the first multimedia file, from the first device 108. The first multimedia file includes the first audio component and the first video component. At step 408, the first device 108 plays the first audio component and the second device 112 plays the first video component. At step 410, the second device 112 receives periodic clock information from the first device 108 during the playback of the first multimedia file. At step 412, the second device 112 determines whether the periodic clock information is valid. If at step 412, the second device 112 determines that the periodic clock information is valid, i.e., the second device 112 determines that the periodic clock information is received within the predetermined time interval, step 414 is performed. At step 414, the second device 112 synchronizes the second clock with the first clock based on the periodic clock information. At step 416, the second device 112 determines whether the playback has stopped. If at step 416, the second device 112 determines that the playback has not stopped, the second device 112 continues to receive the periodic clock information and synchronize the second clock with the first clock based on the periodic clock information. If at step 416, the second device 112 determines that the playback has stopped, the second device 112 stops the synchronization. If at step 412, the second device 112 determines that the periodic clock information is invalid, i.e., the second device 112 determines that the periodic clock information is determined after the predetermined time interval, step 418 is performed. At step 418, the second device 112 rejects the periodic clock information.

Figure 5:
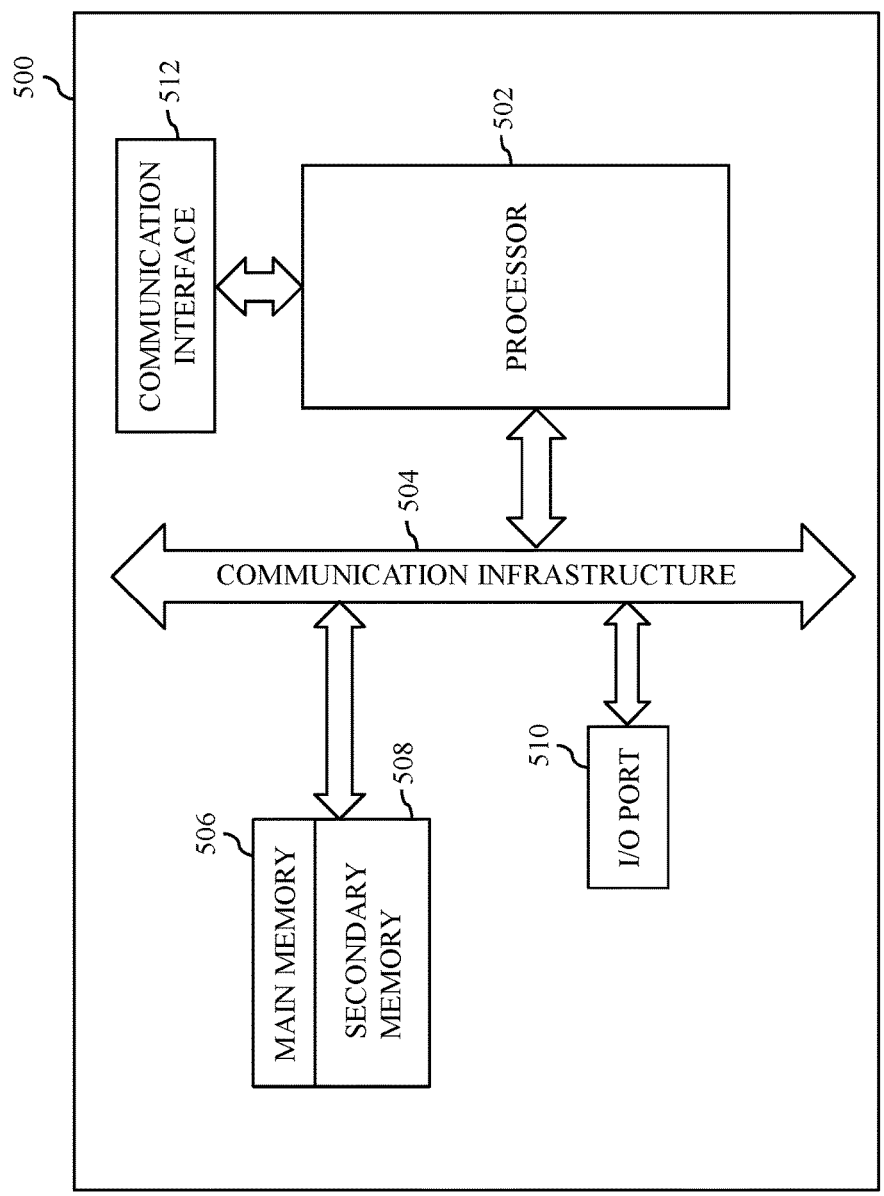
FIG. 5 illustrates a block diagram of a computer system for synchronizing clock of multiple devices for playback of multimedia files in the system environment of FIG. 1 in accordance with an embodiment of the present invention.

Referring now to FIG. 5, a block diagram of a computer system 500 for synchronizing clock of multiple devices for playback of multimedia files in the system environment 100 in accordance with an embodiment of the present invention is shown. An embodiment of present invention, or portions thereof, may be implemented as computer readable code on the computer system 500. In one example, the server 102, the first device 108, and the second device 112 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the method of FIGS. 4A-4C.

The computer system 500 includes a processor 502 that may be a special purpose or a general purpose processing device. The processor 502 may be a single processor, multiple processors, or combinations thereof. The processor 502 may have one or more processor "cores." Further, the processor 502 may be connected to a communication infrastructure 504, such as a bus, a bridge, a message queue, the second communication network 114, multi-core message-passing scheme, and the like. The computer system 500 further includes a main memory 506 and a secondary memory 508. Examples of the main memory 506 may include random access memory (RAM), read-only memory (ROM), and the like. The secondary memory 508 may include a hard disk drive or a removable storage drive (not shown), such as a floppy disk drive, a magnetic tape drive, a compact disc, an optical disk drive, a flash memory, and the like. Further, the removable storage drive may read from and/or write to a removable storage device in a manner known in the art. In an embodiment, the removable storage unit may be a non-transitory computer readable recording media.

The computer system 500 further includes an input/output (I/O) port 510 and a communication interface 512. The I/O port 510 includes various input and output devices that are configured to communicate with the processor 502. Examples of the input devices may include a keyboard, a mouse, a joystick, a touchscreen, a microphone, and the like. Examples of the output devices may include a display screen, a speaker, headphones, and the like. The communication interface 512 may be configured to allow data to be transferred between the computer system 500 and various devices that are communicatively coupled to the computer system 500. Examples of the communication interface 512 may include a modem, a network interface, i.e., an Ethernet card, a communications port, and the like. Data transferred via the communication interface 512 may correspond to signals, such as electronic, electromagnetic, optical, or other signals as will be apparent to a person skilled in the art. The signals may travel via a communications channel, such as the communication channel 302, which may be configured to transmit the signals to devices that are communicatively coupled to the computer system 500. Examples of the communication channel 302 may include, but are not limited to, cable, fiber optics, a phone line, a cellular phone link, a radio frequency link, a wireless link, and the like.

Computer program medium and computer usable medium may refer to memories, such as the main memory 506 and the secondary memory 508, which may be a semiconductor memory such as dynamic RAMs. These computer program mediums may provide data that enables the computer system 500 to implement the method illustrated in FIG. 3. In an embodiment, the present invention is implemented using a computer implemented application, such as the first and second multimedia players 218 and 220. The computer implemented application may be stored in a computer program product and loaded into the computer system 500 using the removable storage drive or the hard disc drive in the secondary memory 508, the I/O port 510, or the communication interface 512.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor such as the processor 502 and a memory such as the main memory 506 and the secondary memory 508 implements the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present invention provide, among other features, a clock synchronizing system and method for playback of multimedia files. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

What is claimed is:

1. A clock synchronizing system for playback of a multimedia file, the clock synchronizing system comprising:
    a first device comprising:
        a memory configured to store the multimedia file, wherein the multimedia file includes at least an audio component and a video component; and
        a processor that communicates with the memory, wherein the processor renders the audio component by way of a first multimedia player, and wherein the processor is configured to:
            transmit the multimedia file to a second device by way of a first communication network; and
            transmit periodic clock information associated with a first clock of the first multimedia player to the second device, wherein the second device renders the video component by way of a second multimedia player, and wherein the second device synchronizes a second clock of the second multimedia player with the first clock of the first multimedia player based on the periodic clock information.

2. The clock synchronizing system of claim 1, wherein the first multimedia player derives the first clock from a clock of the processor.

3. The clock synchronizing system of claim 1, wherein the second multimedia player derives the second clock from a clock of the second device.

4. The clock synchronizing system of claim 1, wherein the second device rejects the periodic clock information, when the second device receives the periodic clock information after a predetermined time interval.

5. The clock synchronizing system of claim 1, wherein the processor is further configured to receive the multimedia file from a server by way of a second communication network.

6. The clock synchronizing system of claim 1, wherein the first and second devices are in a vehicle.

7. A clock synchronizing system for playback of a multimedia file, the clock synchronizing system comprising:
    a first device comprising:
        a processor configured to:
            receive from a second device, the multimedia file by way of a first communication network, wherein the multimedia file includes at least an audio component and a video component, and wherein the first device renders the video component by way of a first multimedia player, and the second device renders the audio component by way of a second multimedia player;
            receive, from the second device, periodic clock information associated with a first clock of the second multimedia player; and
            synchronize a second clock of the first multimedia player with the first clock of the second multimedia player based on the periodic clock information.

8. The clock synchronizing system of claim 7, wherein the first multimedia player derives the second clock from a clock of the processor.

9. The clock synchronizing system of claim 7, wherein the second multimedia player derives the first clock from a clock of the second device.

10. The clock synchronizing system of claim 7, wherein the processor rejects the periodic clock information, when the processor receives the periodic clock information after a predetermined time interval.

11. The clock synchronizing system of claim 7, wherein the second device receives the multimedia file from a server by way of a second communication network.

12. The clock synchronizing system of claim 7, wherein the first and second devices are in a vehicle.

13. A method for clock synchronization, the method comprising:
    receiving, by a first device, a multimedia file, from a second device by way of a first communication network, wherein the multimedia file includes at least an audio component and a video component, and wherein the first device renders the video component by way of a first multimedia player, and the second device renders the audio component by way of a second multimedia player;

receiving, by the first device, periodic clock information associated with a first clock of the second multimedia player; and synchronizing, by the first device, a second clock of the first multimedia player with the first clock of the second multimedia player based on the periodic clock information.

14. The method of claim 13, wherein the second device receives the multimedia file from a server by way of a second communication network.

15. The method of claim 13, wherein the first multimedia player derives the second clock from a clock of the first device.

16. The method of claim 13, wherein the second multimedia player derives the first clock from a clock of the second device.

17. The method of claim 13, further comprising:
rejecting, by the first device, the periodic clock information, when the first device receives the periodic clock information after a predetermined time interval.

18. The method of claim 13, wherein the first and second devices are in a vehicle.

* * * * *